United States Patent [19]

Seamans

[11] 3,859,464

[45] Jan. 7, 1975

[54] ELECTRICAL CIRCUIT FOR A PHONE ANSWERING DEVICE

[76] Inventor: Phillip W. Seamans, Rt. No. 1, Box 116, Rogers, Minn. 55374

[22] Filed: Jan. 29, 1973

[21] Appl. No.: 327,751

[52] U.S. Cl. .......... 179/6 R
[51] Int. Cl. .......... H04m 1/64
[58] Field of Search .......... 179/6 R

[56] References Cited

UNITED STATES PATENTS

| | | | |
|---|---|---|---|
| 2,854,512 | 9/1958 | Zimmermann | 179/6 R |
| 3,499,993 | 3/1970 | Owen et al. | 179/6 R |
| 3,592,968 | 7/1971 | Ogawa et al. | 179/6 R |
| 3,688,043 | 8/1972 | Konno | 179/6 R |
| 3,721,765 | 3/1973 | Ho | 179/6 R |
| 3,728,488 | 4/1973 | Bonsky et al. | 179/6 R |
| 3,728,489 | 4/1973 | Beacham | 179/6 R |
| 3,729,589 | 4/1973 | Bonsky et al. | 179/6 R |

*Primary Examiner*—Stanley M. Urynowicz, Jr.
*Attorney, Agent, or Firm*—Williamson, Bains & Moore

[57] ABSTRACT

An electrical circuit for a phone answering device connectable across the electrical input terminals of a telephone to receive an electrical ringing signal therefrom, the ringing signal entering a ringing signal distinguisher to distinguish an electrical ringing signal from other electrical impulses encountered at the telephone input terminals, the distinguisher conducting ringing signals to a ringing signal counter arranged to actuate a main timer for a first predetermined time interval after reception of a predetermined number of electrical ringing signals by the counter. Actuation of the main timer closes first and second switches of a main timing circuit. Closing of the first switch turns on a second timing circuit which continues in operation for a second predetermined time interval, and while on actuates a message sending unit which may be a conventional cassette player, to play a recorded message to a caller on the phone line. The second switch of the main timing circuit cooperates with the second timing circuit to actuate a message recording receiver which is typically a commercially available cassette recorder to record a message from the caller, the message receiving unit being turned on as the second timing circuit goes off and remaining on until the main timing circuit turns itself off. A sensor detects hanging up of the phone by the caller, and in response thereto turns off the main timing circuit, thereby preventing the invention from recording any incoming message.

5 Claims, 1 Drawing Figure

PATENTED JAN 7 1975 3,859,464
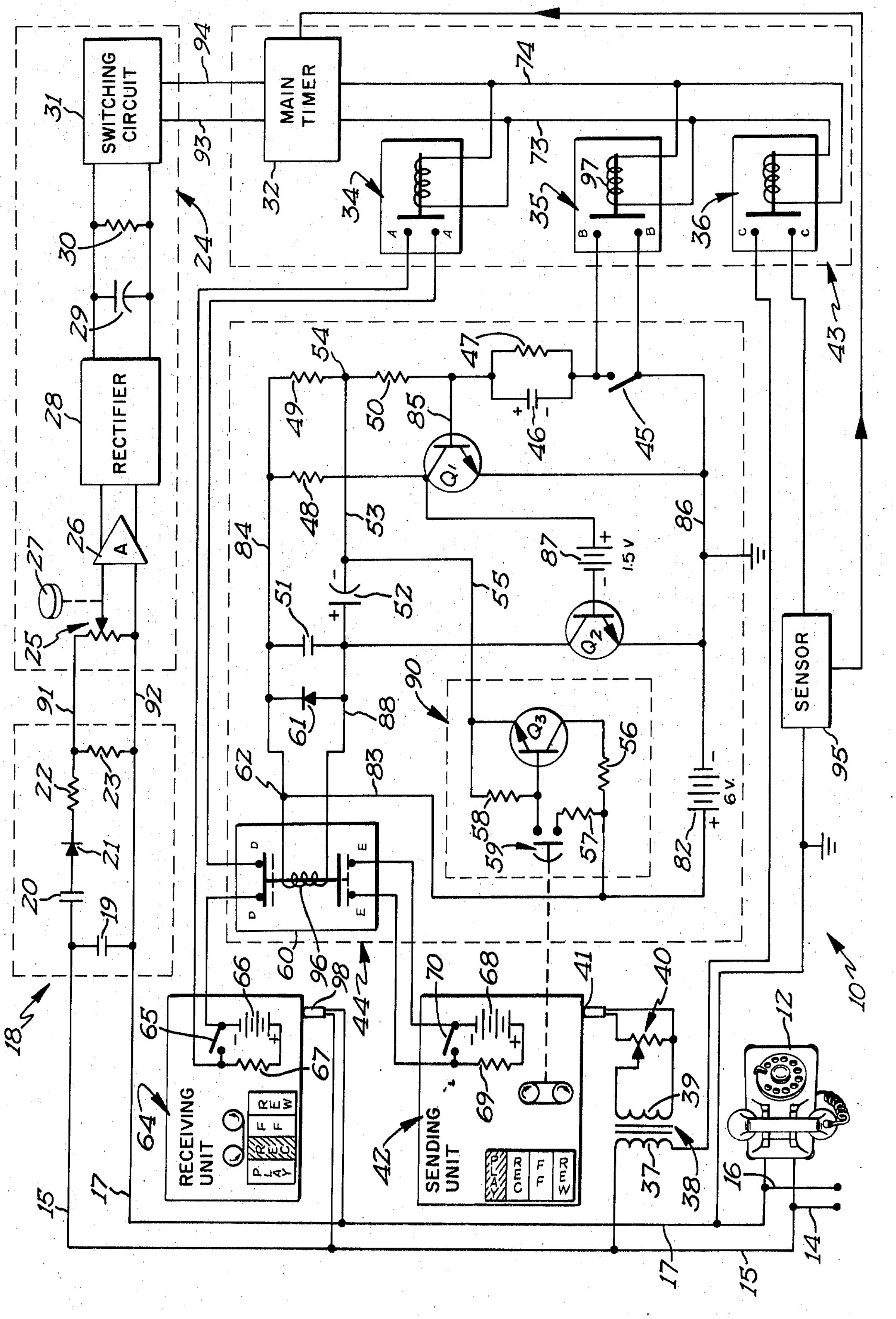

ELECTRICAL CIRCUIT FOR A PHONE ANSWERING DEVICE

BACKGROUND OF THE INVENTION

Most commercially available phone answering devices are preset to respond to an incoming phone call after a fixed number of rings of the telephone, the user having no control over the time at which the incoming phone call is answered by the device. It is often highly desirable that the user be able to set the phone answering device to respond after a predetermined number of ringing signals since the time at which the user would ordinarily be able to intercept the call is determined by such factors as his expected proximity to the phone and the type of work done by the user and its effect upon his ability to immediately detach himself from the work and answer the telephone.

It has been found that a variety of different electrical signals is encountered at the input terminals of telephones, the most usual ones being the ringing signal, the busy signal, the dialing tone, and the dialing signal produced when one dials the telephone. In addition certain other signals occur with considerable regularity. For example, high frequency radio trnasmission is easily intercepted by the telephone lines which act as antennas, the radio signals being induced in the telephone lines and sometimes being of adequate amplitude to trigger a phone answering device. Such descriptive signals must be considered in the design of circuitry for a phone answering device and the present invention has components to attenuate such disruptive signals so they do not actuate the phone answering device.

Another problem encountered with most commercially available phone answering devices is that the device, once actuated by an incoming call, goes through its full cycle of message delivery and reception even when the caller hangs up within seconds of the device answering the call. Since the device may be programmed to a cycle lasting 1 to 3 minutes, this wasted operation uses valuable recording space on the tape and even worse, requires the user to listen to long sketches of dead time when replaying the recorded messages. It is desirable that the phone answering device detect hanging up by the caller and respond properly by turning its message receiving unit off.

BRIEF SUMMARY OF THE INVENTION

The present invention relates to the field of phone answering devices and comprises an inexpensive, highly reliable, and long lasting electrical circuit for a phone answering device. The circuit is designed to utilize a pair of commercially available cassette recorders to serve as message sending and receiving units thereby substantially reducing manufacturing cost. If either of the units fails, it can be easily serviced and replaced with minimal time and expense.

The electrical circuit disclosed herein includes a ringing signal distinguisher capable of distinguishing the conventional phone ringing signal from the other electrical impulses encountered at telephone input terminals and is not actuated by disruptive electrical signals on the telephone line.

The phone answering device circuit is provided with a ringing signal counter which permits the user to set the answering device to respond to an incoming phone call after a predetermined number of rings specially selected by the user to meet his own business or personal requirements. Accordingly, if the user wishes the device to answer an incoming call after one ring, or after a substantially larger number of rings, he can easily adjust the device to meet his own requirement.

The invention has a main timing circuit and a second timing circuit, both being wholly electronic in nature. When the main timing circuit is actuated by the ringing signal counter after a predetermined number of rings have been counted, first and second switches are closed in the main timing circuit and remain closed until the main timing circuit turns off at the end of a first predetermined time interval. The first switch, when closed, actuates the second timing circuit when in turn turns on the message sending unit for a second predetermined time interval during which a recorded message is transmitted electrically to a caller over the phone line. After expiration of the second predetermined time interval, the second timing circuit turns off, terminating operation of the message sending unit. The second switch of the main timing circuit and the second timing circuit cooperate to actuate a message receiving unit as the second timing circuit turns off, a message from the caller being recorded by the message receiving unit during the remainder of the first predetermined time interval at the end of which the main timing circuit terminates operation of the message receiving unit and the phone answering device.

A termination switch is included in the second timing circuit to turn off the second timing circuit and the message sending unit when the recorded message to the caller has been completed. In the event of failure of this termination switch, the second timing circuit will turn off independently of the termination switch.

Various further and more specific purposes, features and advantages of the invention will clearly appear from the detailed description given below, taken in connection with the accompanying drawing which forms part of this specification and illustrates merely by way of example one embodiment of the device of the invention.

BRIEF DESCRIPTION OF THE DRAWINGS

The drawing shows an electrical schematic circuit diagram of an embodiment of the invention, the circuit being connected across the input terminals of a telephone line.

DETAILED DESCRIPTION

Referring now to the drawing, a standard telephone 12 has input terminals 14 and 16, and the input terminals 15 and 17 of circuit 10 embodying the phone answering device invention are connected across the telephone input terminals 14 and 16, respectively. The phone input terminals 14 and 16 are connected to the input of a ringing signal distinguisher 18 identified in the drawing as enclosed within a dotted envelope. The distinguisher 18 has a first capacitor 19 connected across the input terminals 15 and 17. A second capacitor 20, a diode 21, a first resistor 22, and a second resistor 23 are connected in series with one another and in parallel with the capacitor 19. The capacitors 19 and 20, the diode 21, and the resistors 22 and 23 collectively comprise the ringing signal distinguisher, and readily distinguish between an electrical ringing signal and electrical impulses disruptive to the circuit 10 which are encountered at the phone input terminals 14 and 16, as will be further described hereafter.

The output terminals 91 and 92 of the ringing signal distinguisher 18 are connected directly to a ringing signal counter 24, the components of which are indicated as lying within the dotted envelope 24. The input terminals of potentiometer 25 are connected across the output terminals 91 and 92 of the ringing signal counter, the output of the potentiometer 25 leading to amplifier 26. The output voltage from the potentiometer 25 is manually controlled by a dial 27 which is easily accessible to a user of the phone answering device. Adjustment of the dial 27 controls the magnitude of the output voltage from the potentiometer 25, which in turn constitutes the input signal to the amplifier 26. The amplifier 26 should preferably be a fixed gain amplifier but may be selected from a variety of commercially available amplifiers and functions to amplify the signal from the potentiometer to a level adequate to, after rectification by rectifier 28, charge ringing signal counter capacitor 29, which is connected across the output of the rectifier, the rectifier 28 being selected from appropriate commercially available rectifiers. A resistor 30 is connected in parallel with the capacitor 29 and should be of an appropriate value adequate to assure that the capacitor 29 will discharge at a rate compatible with the invention as will be discussed further hereafter. The resistor 30 is connected in parallel with a switching means such as switching circuit 31 which is responsive to a discharge pulse from the capacitor 29. Typically the circuit 31 will contain a transistor switch, the circuit 31 being arranged to deliver an output pulse to the main timer 32 when the switching circuit 31 receives a discharge pulse of predetermined magnitude from the capacitor 29. The switching circuit 31 is unresponsive to voltages below a predetermined level and turns on only when the voltage exceeds the predetermined level. When circuit 31 does turn on its delivers a single pulse to the main timer 32 and then turns off until the next phone call occurs. The switching circuit 31 may be selected from a variety of commercially available switching circuits.

The potentiometer 25, amplifier 26, rectifier 28, capacitor 29, resistor 30, and switching circuit 31, collectively form the ringing signal counter 24, but it should be understood that the shown ringing signal counter is but one type of counter usable with the invention and that other appropriate counters known or obvious to the art are within the purview of the invention.

The output terminals 93 and 94 of the switching circuit 31 lead directly to main timer 32, which is constructed and arranged to turn on in response to a pulse from the switching circuit 31 and to then remain on for a first predetermined time interval, the duration of which may be varied but which typically will be 2 – 3 minutes unless terminated prematurely as will be discussed hereafter.

When the main timer 32 turns on in response to a signal from switching circuit 31, the timer 32, which utilizes its own power supply, or obtains power from conventional sources, energizes relay switches 34, 35, and 36, each of the relays being conventional, commercially available units.

First switch 35 has its terminals B—B open until the main timer 32 turns on, the terminal B—B closing only when main timer 32 is on. Second switch 34 functions in identical fashion to switch 35 and will be discussed further hereafter. Third switch 36 also functions in identical fashion to relay 35, and when energized by timer 32, closes terminals C—C. Closing of terminals C—C completes a circuit form phone input terminal 14 through the primary coil 37 of transformer 38, through the terminals C—C and sensor 95, (discussed hereafter) and thence to ground 16. The secondary coil 39 of transformer 38 is connected through a potentiometer 40 to the output jack 41 of the message sending unit 42. Accordingly, the relay 36 connects the message sending unit 42 across the terminals 14 and 16 of the telephone line when the circuit 10 answers an incoming telephone call, thereby assuring that a message from the message sending unit is delivered to the input terminals 14 and 16 of the telephone 12.

The main timer 32, and relay switches 34, 35 and 36 along with the conductors interconnecting these elements, collectively comprise a main timing circuit 43, delineated in the drawing by envelope 43. It should be understood that while a particular combination of elements has been used to illustrate the main timing circuit 43, other equivalent structures and switches accomplishing the purpose could as readily have been used, and are within the purview of the invention.

The switch terminals B—B of relay 35 are connected to a second timing circuit 44, all components of which are contained within the dotted envelope 44. A manually actuated cycle switch 45 is provided to close the terminals B—B to actuate the circuit 44 independent of the relay switch 35, for purposes to be described further hereafter.

A capacitor 46 and resistor 47 are connected in parallel with one another and between the relay 35 and the base of transistor $Q_1$. The transistor $Q_1$ has its emitter grounded, and a resistor 48 is connected at the collector terminal. Resistors 49 and 50 are connected in series with one another, the resistor 50 being connected to the base terminal of the transistor $Q_1$. A 1.5 volt battery 87 is connected between the collector terminal of transistor $Q_1$ and the base of transistor $Q_2$, the battery having its negative terminal connected to the base of transistor $Q_2$ to ordinarily negatively bias transistor $Q_2$ so that it is turned off and does not conduct. The emitter terminal of the transistor $Q_2$ is grounded, and the collector terminal is connected to capacitors 51 and 52. The capacitor 52 is connected via conductor 53 to point 54 located between resistors 49 and 50. A second conductor 55 extends from the conductor 53 to the emitter terminal of transistor $Q_3$. Transistor $Q_3$ has resistors 56 and 57 in series with one another and between the collector terminal of the transistor and a switch 59. The 6 volt battery 82 has its positive terminal connected between the resistors 56 and 57. A resistor 58 is connected between the emitter terminal of transistor $Q_3$ and the transistor's base.

The normally open switch 59 is mechanically actuated by the moving tape in the message sending unit 42. The switch 59 has terminals located adjacent a continuous tape cassette in the message sending unit, the tape being provided with a conducting strip on the tape which momentarily closes the terminals of the switch 59 as the conducting strip contacts the terminals of the switch 59. The switch 59, resistors 58, 57, and 56 and transistor $Q_3$ collectively comprise a termination switch which function to turn off the second timing circuit 44 when the switch 59 is closed.

The energizing coil of relay 60 is connected in parallel with the capacitor 51 and a diode 61, the positive terminal of the 6 volt battery also being connected to the relay coil at point 62 in order to energize the coil at appropriate times.

The relay 60 is constructed and arranged so as to close terminals D—D when the relay coil is not energized. When the coil is energized, the terminals D—D open and the terminals E—E are closed. Accordingly, when relay 60 is not energized by the second timing circuit 44, the terminals D—D are closed and the message receiving unit 64 will be energized and turn on when second switch 34 is closed by the main timing circuit 43.

The message receiving unit 64 may be a commercially available cassette recorder with a manually actuated switch 65 to permit the unit 64 to be operated independently of the timing circuits. Typically the unit 64 is provided with its own power supply battery 66, the resistance 67 here being used to represent the internal impedance of the message receiving unit 64.

The message sending unit 42 is typically a commercially available cassette recorder, although any unit capable of storing a message and replaying it on command could be used. Like the receiving unit 64, the unit 42 is typically provided with its own battery power supply 68. A resistor 69 represents the internal impedance of the message sending unit. A manually actuated switch 70 permits an operator to turn on the message sending unit independently of the timing circuits when such actuation is desirable for testing and the like. It should be understood that during normal operation of the circuit 10, the manually actuated switches 65 and 70 of units 64 and 42, respectively, are open.

A sensor 95 is connected between phone line terminal 16 and relay switch 36 and is designed to detect the hanging up of the caller's telephone after the phone answering device 10 has responded and main timing circuit 43 is on and switch 36 closed. The sensor, on detecting hanging up of the caller's phone delivers a signal to main timer 32 to turn off the timer immediately. Typically the sensor 95 monitors the current or voltage signal from the telephone terminal 16 and when it detects an electrical change provided by hanging up, it turns off the main timer. This may be accomplished in various ways; in some telephone exchanges the voltage across terminals 14 and 16 changes polarity when hanging up occurs. The polarity change is detected and the sensor 95 then responds by turning off the timer 32.

In operation, one first connects the input terminals 15 and 17 of the phone-answering device 10 to the telephone line terminals 14 and 16. The message sending and receiving units 42 and 64, respectively, are then prepared for operation by installing batteries 68 and 66, respectively, and by inserting an appropriate tape cassette in unit 64 to record messages and a conventional endless tape cassette in unit 42. The endless tape used with unit 42 is provided with a conducting strip at the end of the recorded message of the endless tape, the conducting strip serving to close a pair of contacts at switch 59 as the recorded message is completed. Such endless tapes and conducting strips are known to the art and will not be further discussed. The sending unit 42 is placed in the "play" mode and the receiving unit 64 in the "record" mode. The amplifier 26, switching circuit 31, and main timer 32 may be provided with their own power sources as is the second timing circuit 44 and sending and receiving units 42 and 64. Naturally if it is desired to do so, the recited components may be powered by a single power source as is known to those skilled in the art and such provision is within the purview of the invention. After connecting the invention 10 to the telephone lines 14 and 16, the power to the recited components is turned on and the phone-answering device 10 is now ready for operation.

When a ringing signal occurs across the phone lines 14 and 16 in response to a caller ringing the telephone 12, the signal is conducted along lines 15 and 17 to the ringing signal distinguisher 18. Ringing signals have a magnitude of approximately 50 volts and a frequency adequate to pass current through the capacitor 20 and thence through diode 21 and resistors 22 and 23, a substantial voltage drop occurring across resistor 23. A potentiometer 25 is connected across resistor 23 and the potentiometer adjusted to pass a predetermined fraction of the voltage drop across the potentiometer to the input of amplifier 26.

Amplifier 26 amplifies the signal from the potentiometer 25, after which the output of the amplifier is rectified by rectifier 28. The output of the rectifier 28 charges ring signal counter capacitor 29, the capacitor 29 thus acquiring a charge which increases in magnitude with the passage of time since it is being struck by charging pulses resulting from repeated ringing signals from the telephone. A switching circuit 31 is arranged to be actuated when the voltage across the capacitor 29 reaches a predetermined value. When this predetermined value is reached, the switching circuit 31 turns on to send a signal to the main timer 32, such switching circuits being well known to the art and hence not further discussed here.

If it is desired that the phone-answering device 10 respond at once to an incoming call when the first ring occurs, the potentiometer 25 is set by its dial 27 to pass substantially the entire voltage drop occurring across it, resulting in the amplifier 26 receiving a larger input signal and delivering a larger magnitude output signal to the rectifier 28 and hence to capacitor 29. This large signal assures that the capacitor 29 rapidly acquires a charge adequate to turn on the switching circuit 31. However, if it is desired that the phone-answering device respond to a telephone call after a greater number of rings has occurred, the potentiometer 25 is adjusted to pass a lower voltage signal to the amplifier 26. Accordingly, the output signal from the amplifier 26 which reaches rectifier 28 and capacitor 29 is substantially smaller and a plurality of such signals must reach the capacitor 29 before the predetermined charge level is reached which is adequate to turn on switching circuit 31. Accordingly, by adjusting the potentiometer 25, it s possible for the user to have the phone-answering device 10 respond to an incoming call after a predetermined desirable number of rings has occurred.

While an electrical ringing signal passes through the ringing signal distinguisher 18 with little attenuation, disruptive electrical signals commonly encountered on telephone lines are substantially attenuated. One potentially disruptive signal is the low frequency signal associated with dialing the telephone, such signal having an approximate amplitude of 50 volts. However, because the dialing signal is of a very low frequency, it does not pass through the ringing signal distinguisher because of the capacitor 20 and accordingly is blocked from reaching the capacitor 29. It has also been found that certain high frequency signals occurring on the phone lines 14 and 16 are adequate to disrupt the operation of the invention if not attenuated. It is believed such signals are attributable to extraneous radio transmission received by the telephone lines which serve as antennas. These high frequency signals are passed from terminal 15 through capacitor 19 to ground 17, the capacitor 19 acting substantially as a short circuit for such high frequency signals. Accordingly, these high frequency signals are attenuated and do not pass through the ringing signal distinguisher and do not reach the ringing signal counter capacitor 29.

In practice, it has been found that a 0.001 microfarad capacitor is an acceptable value for the capacitor 19. A 0.01 microfarad value has been found useful for capacitor 20. Acceptable values for resistors 22, 23, 25 are 22 K ohms, 1,000 ohms and 5K ohms, respectively. It should be understood that the foregoing values are included purely as illustrative, and that other values could as readily be used, a range of values being within the purview of the invention.

The amplifier 26 may be selected from those known to the art, the type selected preferably having a substantially constant gain so that the capacitor 29 will be charged at a predictable rate determined solely by the output voltage across potentiometer 25. In practice, it has been found that acceptable values for the capacitor 29 and resistor 30 and 500 microfarads and 69 K ohms, but it should be understood that a range of values are within the purview of the invention.

The switching circuit 31 is selected from known circuitry and sends a signal to the main timer 32 to turn on the main timer when the switching circuit 31 detects a discharge pulse across resistor 30 from capacitor 29. The discharge pulse must be greater than a predetermined minimum voltage in order to turn on the switching circuit 31. Accordingly, the time elapsing between the first ringing signal and occurrence of the predetermined voltage across capacitor 29 is determined by the voltage across the output of potentiometer 25 which is amplified by amplifier 26 to charge the capacitor 29. Accordingly, a user by adjusting potentiometer 25 can increase or decrease the magnitude of each charging pulse delivered from the amplifier 26 to the capacitor 29 and by increasing or decreasing the voltage output of potentiometer 25 can decrease or increase, respectively, the time required for the capacitor 29 to charge to the minimum required voltage to turn on the switching circuit 31.

To illustrate, if the user sets potentiometer 25 so that three ringing signals are required to actuate the circuit 31, then each of the first three ringing signals will be amplified and passed successively to the capacitor 29, each amplified signal charging the capacitor to a higher voltage level until, on the third ring, the predetermined voltage level needed for circuit 31 is reached and switching circuit 31 turns on. Because the telephone is then answered, no further rings occur, the capacitor 29 remains discharged, and the distinguisher 18 and counter 24 are ready to receive the next phone call when it occurs. The switching circuit 31 turns on only long enough to deliver a pulse to main timer 32 and then becomes inactive until again actuated by a discharge from capacitor 29.

In the event the user picks up his phone before the capacitor 29 is charged adequately to turn on the switching circuit 31, no further charging occurs because the telephone ringing signal ceases. If the phone is picked up from its cradle after the circuit 31 turns on, then the recorded message of unit 42 continues to play and any conversation between the user and the caller will be recorded from the time receiving unit 65 is actuated until main timer 32 turns off or the caller hangs up.

The main timer 32 is an electronic timer constructed in accord with known principles and may utilize any of a variety of known timer circuits, the unit selected being adjustable to remain on for a first predetermined time interval which may be from 1 to 3 minutes in length, the interval beginning when the timer is initially turned on by a signal from the switching circuit 31.

First, second and third relay switches, 34, 35 and 36, respectively, are connected in parallel with one another and are energized continuously while the main timer 32 is on. When the circuit 32 turns off, each of the relay switches reopens. Energizing of relay 35 causes terminals B—B to close, resulting in the second timing circuit 44 being turned on, as will be further described hereafter. Closing of terminals A—A of relay switch 34 closes a circuit which causes the message receiving unit 64 to turn on to record an incoming message, provided that relay 60 moves to close terminals D—D. If the terminals D—D are closed, current flows from battery 66 through the internal impedance of the receiving unit 67 and thence through terminals A—A of relay 34 and terminals D—D of relay 60, then returning to the low end of the battery 66. Naturally, if the terminals D—D are open, the message receiving unit 64 does not operate, and the operation of the receiving unit will be discussed further hereafter in conjunction with the operating of the second timing circuit 44.

Relay switch 36, when energized by the main timer 32, closes terminals C—C causing the signal across the input terminals 14 and 16 of the telephone 12 to pass from the telephone through the primary coil 37 of transformer 38, the secondary coil 39 being connected through a potentiometer 40 to control the magnitude of the signal from external speaker jack 41 of the message sending unit 42 to the secondary coil 39. Accordingly, when the sending unit 42 is operating, the recorded message from the tape cassette is played from jack 41 to the secondary coil 39 of transformer 38 and thence is linked to the primary coil 37 and played into the telephone 12 to be heard by a caller.

The operation of the second timing circuit 44 will now be described in detail. Prior to the time at which the main timing circuit 43 turns on, the first relay switch 35 is unenergized producing an open circuit condition between its terminals B—B. While the main timing circuit 43 remains off, the relay 60 of the second timing circuit has its terminals D—D closed and the holding coil 96 is unenergized. Before the main timing circuit 43 turns on, transistors $Q_2$ and $Q_3$, which are used as switches, are in an off condition; transistor $Q_1$ is on and is conducting. Before the main timing circuit 43 is turned on, a small current flows from battery 82 along conductors 83 and 84 and then through resistors 49 and 50 to provide a positive voltage at the base 85 of transistor $Q_1$ and a base-to-emitter current passing therethrough a ground 86, thereby keeping the transistor $Q_1$ in an on condition.

Transistor $Q_1$, being in an on condition, conducts current from conductor 84, through resistor 48, and thence through the transistor $Q_1$ which acts as a substantially short circuit to ground 86. At this time capacitor 46 is uncharged and no current is flowing from the base of the transistor $Q_1$ through resistor 47 or capacitor 46. Likewise, no current flows from the battery 82 through the holding coil 96 of relay 60 because transistor $Q_2$ is turned off and the capacitor 52 is still uncharged. Both message receiving unit 64 and the message sending unit 42 are off and not yet operating. The battery 87 keeps the base of transistor $Q_2$ negatively biased to assure the transistor 78 remaining in an off condition prior to the main timing circuit 43 turning on when main timer 32 turns on.

When the main timer 32 turns on in response to a signal from switching circuit 31 the main timing circuit 43 goes into operation, and the holding coil 97 of first relay switch 35 is energized to close terminals B—B, creating an immediate path from ground 86, through resistor 47, to the base 85 of transistor $Q_1$. Accordingly, the base 85 of transistor $Q_1$ is essentially grounded, removing the previously existing positive charge on the base 85 and immediately turning the transistor $Q_1$ off to begin the second predetermined time interval. Accordingly, current from resistor 48 no longer flows through transistor $Q_1$ and is instead diverted to the base of the transistor $Q_2$, the current being sufficient to overcome the battery 87 and positively bias the base of transistor $Q_2$, turning it on. With the transistor $Q_2$ on, current from battery 82 passes along conductor 83, through holding coil 96 of relay 60, energizing the relay and causing it to move to position 99 to close terminals E—E and open terminals D—D. Current leaving the holding coil of relay 60 passes along conductor 88 and flows to ground through the non-conducting transistor $Q_2$, simultaneously charging capacitor 52, which puts a substantial negative charge on the base of transistor $Q_1$, assuring that the transistor $Q_1$ remains in an off condition until the negative charge on the capacitor 52 is discharged. Current flowing from battery 82 through conductor 84 and resistors 49 and 50 charges capacitor 46 as it flows to ground 86 through now closed relay switch 35.

With the relay 60 closing its terminals E—E, the battery 68 of the sending unit 42 supplies power to the sending unit, actuating it and playing the endless tape containing an appropriate message to the caller. The electrical signal generated by the recorded tape message leaves the sending unit 42 through output jack 41 and passes through the potentiometer 40 and transformer 39 which couples it to the telephone line terminals 14 and 16. Because terminals D—D of relay 60 are open, the receiving unit 64 is turned off and remains off until the terminals D—D again close. It should be understood that the receiving unit 64 is operating only when terminals D—D of relay 60 and terminals A—A of relay 34 are simultaneously closed, requiring the main timing circuit 43 and the second timing circuit 44 to cooperate in order to operate the receiving unit 64.

Appropriate and desirable values for the component of second timing circuit 44 are as follows:

| | |
|---|---|
| capacitor 51 | = 0.05 microfarads |
| capacitor 52 | = 500 microfarads |
| resistor 48 | = 3.3 K ohms |
| resistor 49 | = 69 K ohms |
| resistor 50 | = 150 ohms |
| capacitor 46 | = 0.05 microfarads |
| resistor 47 | = 1 megohm |

-Continued

| | |
|---|---|
| resistor 58 | = 10 K ohms |
| resistor 57 | = 100 ohms |
| resistor 56 | = 10 ohms |

The endless tape used in the sending unit 42 forms part of termination switch 90 and is provided with a conductive strip on the tape which, on completion of playing the recorded message, closes the terminals of the switch 59. As switch 59 closes, termination switch 90 goes into operation, current from battery 82 flowing through resistor 57 and switch 59 to the base of transistor $Q_3$, turning the transistor $Q_3$ on to permit current flow from battery 82 through resistor 56 and thence through the transistor $Q_3$, the current flow through transistor $Q_3$ supplying positive charge to the negative side of charged capacitor 52 to remove the charge on the capacitor 52 essentially instantaneously. Elimination of the negative charge on capacitor 52 removes its influence on the base 85 of transistor $Q_1$ and effectively terminates the second predetermined time interval. Accordingly, the positive charge across capacitor 46 immediately turns transistor $Q_1$ on, permitting current to flow from resistor 48 directly through the transistor $Q_1$ to ground 86. Since $Q_1$ is then substantially a short circuit from resistor 48 to ground 86, there is no further current flow from resistor 48 to the base of transistor $Q_2$, and the battery 87 immediately turns off transistor $Q_2$ by negatively biasing its base. As transistor $Q_2$ turns off, the holding coil 96 of relay 60 ceases to be energized and the terminals E—E open and the terminals D—D close. Opening of terminals E—E turns off power to the message sending unit 42, and closure of terminals D—D turns on the message receiving unit 64 since terminals A—A of relay 34 are still closed and remain so until main timer 32 turns off at the end of the first predetermined time interval. Current again flows from the 6 volt battery 82 through conductors 83 and 84 to and through resistor 49 and through transistor $Q_1$ which remains on because positively biased by charged capacitor 46. When the main timing circuit 48 turns off at the end of the first predetermined time interval which may be 2 to 3 minutes, the relays 34, 35, and 36 open simultaneously. When the switch 35 opens terminals B—B, the capacitor 46 will rapidly discharge over resistor 47 and not be recharged until the switch 35 is again closed. Until switch 35 is reclosed, transistor $Q_1$ is kept in an on condition by current flow from battery 82 which flows through conductors 83 and 84 and resistors 49 and 50 to provide a base current to $Q_1$.

As terminals D—D of relay 60 close, current is supplied from battery 66 to the impedance 67 of the receiving unit 64. The unit 64 begins operation and, being set for recording, records the caller's message received across the terminals 14 and 16 of the telephone, which are connected to its input 98 through conductors 15 and 17. The receiving unit 64 continues to record until the main timing circuit 43 turns off unless the caller hangs up prior to that time, which condition will be discussed hereafter. The main timing circuit operates for a first predetermined time interval which may be 1 to 3 minutes, and the second timing circuit 44 for a second predetermined time interval which typically may be 30 – 60 seconds. In the time interval remaining after the sending unit 42 is turned off but before the main timing circuit 43 turns off, the receiving unit 64 records the conversation. When the main timing circuit 43 turns off, the relays 34, 35 and 36 open and receiving unit 64 turns off as relay 34 opens terminals A—A. Simultaneously relay 35 opens terminals B-B and capacitor 46 discharges across resistor 47; relay 36 opens terminals C—C to disconnect the sending unit output 41 from the telephone line. The circuit 10 is now ready to receive another phone call. Capacitor 29 in the ringing signal counter 24, being fully discharged across the switching circuit 31, is ready for charging when the next telephone call comes in.

The sensor 96 is useful when the caller hangs up the telephone before the main timer turns off. When the sensor, operatively connected across the phone line, detects hanging up by the caller it sends a signal to the main timer 32 to immediately turn off the timer 32. When the timer 32 is turned off by the sensor 95, the main timing circuit's relays 34, 35 and 36 open and operation is as already described with the receiving unit 64 ceasing operation. When the main timer 32 is turned off by the sensor 95, the second timing circuit 44 continues in operation independently until the end of its described second predetermined time interval and then turns off. The sensor 95 thus assures that receiving unit 64 does not record after the caller has hung up and thus avoids the wasting of valuable tape recording space and the wasting of the user's time in listening to stretches of tape on which no messages are recorded.

A cycle switch 45 is provided so that in the event the endless tape used with the sending unit 42 is not in its starting position, the user can close the cycle switch 45 and the second timing circuit 44 will turn on, as already described, running through a cycle and then turning off, leaving the endless tape in position to replay when a telephone call comes in.

When an operator wishes to listen to the messages which have been recorded during his absence, he closes switch 65 of the receiving unit 64, rewinds the tape to its starting position, and then plays it back in the manner conventional with commercially available cassette players.

Accordingly the invention provides an improved electrical circuit for a phone answering device which detects a telephone call and answers the telephone after a predetermined number of rings, the circuit operating wholly without mechanical movement of the phone receiver. A message is automatically player to the caller and any message from the caller recorded for later review by the user. If no message is left by the caller, the device automatically turns off its main timer when the caller hangs up thereby conserving both tape and the reviewer's time.

While the preferred embodiments of the present invention have been described, it should be understood that various changes, adaptations and modifications may be made therein without departing from the spirit of the invention and the scope of the appended claims.

What is claimed is:

1. An electrical telephone answering device usable with an electrical power source to receive electrical ringing signals and messages from the electrical terminals of a telephone and to deliver messages thereto, comprising:

a main electrical timing circuit connectable with the power source and including a main timer with input and output terminals, said main timer defining a first predetermined time interval when actuated by a predetermined signal and said main timing circuit further including first and second electrical relay switches, each having a pair of normally open switch terminals and a holding coil, each holding coil electrically connected to the output terminals of said main timer and energized by said main timer during said first predetermined time interval to close said switch terminals of said first and second relay switches during said first predetermined time interval;

a message receiving unit operatively electrically connectable to the terminals of the telephone for receiving messages from the telephone terminals, said message receiving unit being electrically connectable to the power source and electrically connected with the switch terminals of one of said electrical relay switches of said main timing circuit to energize said message receiving unit from the power source to record the message of a caller when said relay switches of said main timing circuit are closed;

a message sending unit operatively electrically connectable to the power source and having a message output connected in a series circuit passing through the switch terminals of one of said electrical relay switches of said main timing circuit and connectable across the telephone terminals when the said relay switches of said main timing circuit close so as to deliver a message to the telephone terminals;

a ringing signal counter electrically connectable with the terminals of the telephone and the power source, and electrically connected to the input terminals of said main timer to deliver said predetermined signal to said main timer in response to receiving of a predetermined number of ringing signals from the terminals of the telephone; and a second electrical timing circuit connectable to the power source and defining a second predetermined time interval, said second timing circuit electrically connected to the switch terminals of one of said relay switches of said main timing circuit and actuated by closing of said relay swtiches of said main timing circuit to begin timing of said second predetermined time interval, said second timing circuit including a relay switch having normally open switch terminals and a holding coil, said holding coil electrically connected in said second timing circuit to be energized for closing said switch terminals during said second predetermined time interval, said relay switch of said second timing circuit having its switch terminals operatively electrically connected to said message sending unit and connectable to the energy source to conduct electrical energy from the energy source to the sending unit to energize said sending unit when said relay switch terminals of said second timing circuit close during said second predetermined time interval.

2. The electrical telephone answering device of claim 1 wherein said message sending unit is a tape recorder having an endless tape thereon and wherein said second timing circuit includes a termination switch, said termination switch including a shorting strip positioned on said endless tape and further including a pair of electrical contacts positioned adjacent said tape to be shorted by said strip and electrically connected in said second timing circuit to turn off said second timing circuit in response to closing of said contacts by said shorting strip thereby prematurely terminating said second predetermined time interval.

3. The electrical telephone answering device of claim 1 wherein said ringing signal counter includes:

an amplifier with input and output, the input operatively connectable with the telephone terminals to amplify ringing signals thereform;

a capacitor and discharge resistor electrically connected in parallel with one another and electrically connected with said output of said amplifier to charge said capacitor therefrom;

a potentiometer electrically connected with said capacitor to selectively vary the voltage level applied to said capacitor to thereby control the length of the time interval required to charge said capacitor to a predetermined voltage level; and a switching circuit electrically connected to said discharge resistor and to said main timer and responsive to a predetermined voltage level on said capacitor to generate said predetermined signal and apply said predetermined signal to said main timer.

4. The electrical telephone answering device of claim 3 and further including a manually actuated control accessible to an operator and mechanically connected to said potentiometer to permit the operator to manually control the resistive value of the potentiometer thereby permitting the operator to control the number of ringing signals required to charge said capacitor to said predetermined voltage level.

5. An electrical telephone answering device usable with an electrical power source to receive electrical ringing signals and messages from the electrical terminals of a telephone and to deliver messages thereto, comprising:

a main electrical timing circuit connectable with the power source and including a main timer with input and output terminals, said main timer defining a first predetermined time interval when actuated by a predetermined signal and said main timing circuit further including first and second electrical relay switches, each having a pair of normally open switch terminals and a holding coil, each holding coil electrically connected to the output terminals of said main timer and energized by said main timer during said first predetermined time interval to close said switch terminals of said first and second relay switches during said first predetermined time interval;

a message receiving unit operatively electrically connectable to the terminals of the telephone for receiving messages from the telephone terminals, said message receiving unit being electrically connectable to the power source and electrically connected with the switch terminals of one of said electrical relay switches of said main timing circuit to energize said message receiving unit from the power source to record the message of a caller when said relay switches of said main timing circuit are closed;

a message sending unit operatively electrically connectable to the power source and having a message output connected in a series circuit passing through the switch terminals of one of said electrical relay switches of said main timing circuit and connectable across the telephone terminals when the said relay switches of said main timing circuit close so as to deliver a message to the telephone terminals;

a switching circuit electrically connectable with the terminals of the telephone and the power source, and electrically connected to the input terminals of said main timer to generate and deliver said predetermined signal to said main timer in response to receiving of ringing signals from the terminals of the telephone; and a second electrical timing circuit connectable to the power source and defining a second predetermined time interval, said second timing circuit electrically connected to the switch terminals of one of said relay switches of said main timing circuit and actuated by closing of said relay switches of said main timing circuit to begin timing of said second predetermined time interval, said second timing circuit including a relay switch having normally open switch terminals and a holding coil, said holding coil electrically connected in said second timing circuit to be energized for closing said switch terminals during said second predetermined time interval, said relay switch of said second timing circuit having its switch terminals operatively electrically connected to said message sending unit and connectable to the energy source to conduct electrical energy from the energy source to the sending unit to energize said sending unit when said relay switch terminals of said second timing circuit close during said second predetermined time interval.

* * * * *